(12) United States Patent
Larsen

(10) Patent No.: US 7,085,877 B1
(45) Date of Patent: Aug. 1, 2006

(54) METHOD AND APPARATUS FOR COMBINATION HOST BUS ADAPTER

(75) Inventor: Jan Peter Thoro Larsen, Hudson, WI (US)

(73) Assignee: Adaptec, Inc., Milpitas, CA (US)

( * ) Notice: Subject to any disclaimer, the term of this patent is extended or adjusted under 35 U.S.C. 154(b) by 409 days.

(21) Appl. No.: 10/108,063

(22) Filed: Mar. 26, 2002

(51) Int. Cl.
*G06F 13/36* (2006.01)

(52) U.S. Cl. .................................................... 710/315

(58) Field of Classification Search ........ 710/301–304, 710/315
See application file for complete search history.

(56) References Cited

U.S. PATENT DOCUMENTS

| | | | | |
|---|---|---|---|---|
| 5,799,196 | A * | 8/1998 | Flannery ..................... | 713/320 |
| 5,987,581 | A * | 11/1999 | Nale ........................... | 711/202 |
| 6,058,441 | A * | 5/2000 | Shu ............................ | 710/100 |
| 6,061,746 | A * | 5/2000 | Stanley et al. ............... | 710/10 |
| 6,073,193 | A * | 6/2000 | Yap ............................ | 710/100 |
| 6,098,174 | A * | 8/2000 | Baron et al. ................. | 713/300 |
| 6,150,925 | A * | 11/2000 | Casazza ...................... | 340/425.5 |
| 6,202,103 | B1 * | 3/2001 | Vonbank et al. ............. | 710/15 |
| 6,272,584 | B1 * | 8/2001 | Stancil ........................ | 710/241 |
| 6,356,968 | B1 * | 3/2002 | Kishon ........................ | 710/306 |
| 6,460,143 | B1 * | 10/2002 | Howard et al. ............... | 713/323 |
| 6,622,178 | B1 * | 9/2003 | Burke et al. .................. | 710/15 |
| 2002/0062461 | A1 * | 5/2002 | Nee et al. .................... | 714/28 |

OTHER PUBLICATIONS

FirewireDirect Firewire/USB Combo Users manual.*
"Agere Systems announces single PCI slot 1394 and USB combination card reference design for personal computers" Jun. 4, 2001.*
IEEE1394 & USB2.0 Combo PCI Board PCIFU2U User's Guide Rev 1.0 Dec. 2001.*
IEEE 1394/USB Combo PCI Board for Windows98SE/2000/Me PCIFU1U User's Guide Rev 1.0 Nov. 2000.*
Press Release, Nov. 15, 1999 COMDEX/Fall RATO Systems, Inc.*

* cited by examiner

*Primary Examiner*—Paul R. Myers
(74) *Attorney, Agent, or Firm*—Martine Penilla & Gencarella, LLP

(57) ABSTRACT

Methods and an apparatus for a combination host bus adapter are provided. In one embodiment, a host bus adapter card is provided. The host bus adapter card is configured to be placed into a peripheral component interface (PCI) slot of a general purpose computer. The host bus adapter card includes a universal serial bus (USB) controller. The USB controller is in communication with a first electrically erasable programmable read only memory (EEPROM). A 1394 controller is included. The 1394 controller is in communication with a second EEPROM. A PCI to PCI bridge is also included. The bridge is in communication with the USB controller, the 1394 controller and a third EEPROM. The first, second and third EEPROMs are configured to be accessed by a utility, which enables in-circuit modification of the USB controller, the 1394 controller and the PCI to PCI bridge by a user of the general purpose computer.

17 Claims, 4 Drawing Sheets

METHOD AND APPARATUS FOR COMBINATION HOST BUS ADAPTER

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to methods and apparatus for providing a bridge for a combination host bus adapter card to combine different interface technologies onto the host bus adapter card and more specifically to providing the ability to modify the controllers of the bridge and the interface technologies in-circuit.

2. Description of the Related Art

Original equipment manufacturers (OEM) place platform independent bridge chips onto a motherboard to allow for the ability to have different communications going through the peripheral component interconnect (PCI) bus. For example, a user can place a universal serial bus (USB) adapter card or 1394 adapter card into a PCI slot on the motherboard and the bridge chip on the motherboard enables the communication through each of the PCI slots. However, the number of PCI slots available for different technologies is limited, especially for legacy systems. As a user has a plethora of choices available for add on options, such as sound cards, web cams, video camcorders, etc., the user is limited by the number of slots available for peripheral devices.

In addition, the motherboard bridge chip can not be configured by the user easily and without severe consequences if done improperly. For example, if a user or engineer makes an improper change to the bridge chip configuration, the system will be irreparably damaged without recovery. Because of the severe consequences for an improper change, it is rare for skilled technicians to attempt to change the chip configuration, not to mention a general purpose computer user. The limited ability to reconfigure the bridge chip configuration correlates to limited ability to support multiple platforms.

An attempt has been made to provide limited programming ability on the host bus adapter (HBA) cards inserted into the PCI slots of a computer. However, the components of the HBA cards must be de-soldered and removed from the card, inserted into a special programming unit where its content is modified, and then the component is re-soldered back onto the HBA card. Because of the complicated process, only a highly trained professional with access to specialized equipment is capable of performing this task. Therefore, the typical user is left with no choice but to send the card to have it modified by the skilled professional.

Additionally, if the vendor of the card becomes aware of a modification which improves the performance of the HBA card, the vendor does not have the ability to perform the modifications while the cards are on the user's system. The vendor would have to have the HBA cards returned if they desire to incorporate the modification to HBA cards in the field. However, this is an economically unattractive alternative. Furthermore, if the HBA card is not functioning properly and is returned to the vendor, then the vendor must remove the faulty component from the card in order to make any modifications. This process is both costly and highly labor intensive.

More importantly, the amount and types of peripherals connected to a HBA card influence the configuration of the chip configuration on the card. For example, if a sole storage device is connected to the HBA card, the user may desire a configuration optimized for performance. On the other hand, where a scanner, printer and a storage device are connected through the HBA card, the user may desire a configuration optimized for compatibility and the handling of arbitration requests. Currently, a user is not allowed any flexibility to optimize the configuration of the card from the state it is shipped in from the vendor.

As a result, there is a need to solve the problems of the prior art to provide a HBA card which can be easily configured to provide the user and the vendor flexibility in configuring the components of a HBA card while the components are mounted on the card, wherein the modifications do not cause any conflicts and the multiple components of the card remain interoperable with each other.

SUMMARY OF THE INVENTION

Broadly speaking, the present invention fills these needs by providing methods and an apparatus which allows for controllers of multiple interface technologies to be modified in-circuit. Additionally, the card and its hardware components are able to respond to power management requests from the operating system in an acceptable manner for the operating system. It should be appreciated that the present invention can be implemented in numerous ways, including as a process, an apparatus, a system, or a device. Several inventive embodiments of the present invention are described below.

In one embodiment, an adapter card is provided. The adapter card is configured to be in communication with a general purpose computer having an operating system. The adapter card includes a first controller providing a first interface technology. The first controller has a first program which is in-circuit modifiable. A second controller providing a second interface technology is included. The second controller has a second program which is in-circuit modifiable. A bridge controller is also included. The bridge controller is in communication with the first and second controllers and the bridge controller has a third program which is in-circuit modifiable. The first, second and third programs are configured to interact with the operating system such that requests sent by the operating system are translated for the first, second and bridge controllers and responses from the first, second and bridge controllers are translated for the operating system.

In another embodiment, a host bus adapter card is provided. The host bus adapter card is configured to be placed into a peripheral component interface (PCI) slot of a general purpose computer. The host bus adapter card includes a universal serial bus (USB) controller. The USB controller is in communication with a first electrically erasable programmable read only memory (EEPROM). A 1394 controller is included. The 1394 controller in communication with a second EEPROM. A PCI to PCI bridge is also included. The bridge is in communication with the USB controller, the 1394 controller and a third EEPROM. The first, second and third EEPROMs are configured to be accessed by a utility, which enables in-circuit modification of the USB controller, the 1394 controller and the PCI to PCI bridge by a user of the general purpose computer.

In yet another embodiment, a method for synchronizing multiple interface technologies on a host bus adapter is provided. The host bus adapter is configured to operate at a plurality of power states. In addition, the multiple interface technologies are in communication with a bridge on the host bus adapter. The bridge on the host bus adapter is in communication with a general purpose computer. The method initiates with a power management request being issued to the host bus adapter from an operating system of the general purpose computer. Then, the power management request is translated for the multiple interface technologies and the bridge. Next, the power management request is executed. Then, a response that the power management request has been executed is issued. Next, the response is translated for the operating system.

In still another embodiment, a method for enabling a user to modify controllers of hardware components on a host bus adapter (HBA) card while the controllers are on the card is provided. The card in communication with a general purpose computer and the card has a plurality of ports configured to communicate with peripheral devices. The method initiates with designating an operating system of the general purpose computer. Then, the peripheral devices in communication with the HBA card are defined. Next, the user is presented with options including enhanced performance and improved compatibility. Then, in response to the user choosing one of the options, the method further includes accessing the controllers for the hardware components on the HBA card and modifying contents of the controllers to achieve the one of the options chosen by the user. The accessing and the modifying is transparent to the user.

The advantages of the present invention are numerous. Most notably, hardware components of the HBA card are configured to be modified in-circuit. In addition, a user can customize the configuration of the hardware components depending on the architecture of the user's system. Furthermore, a translation layer is provided to ensure that the hardware components and operating system communicate effectively with respect to power management and bus/bridge speed synchronization.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
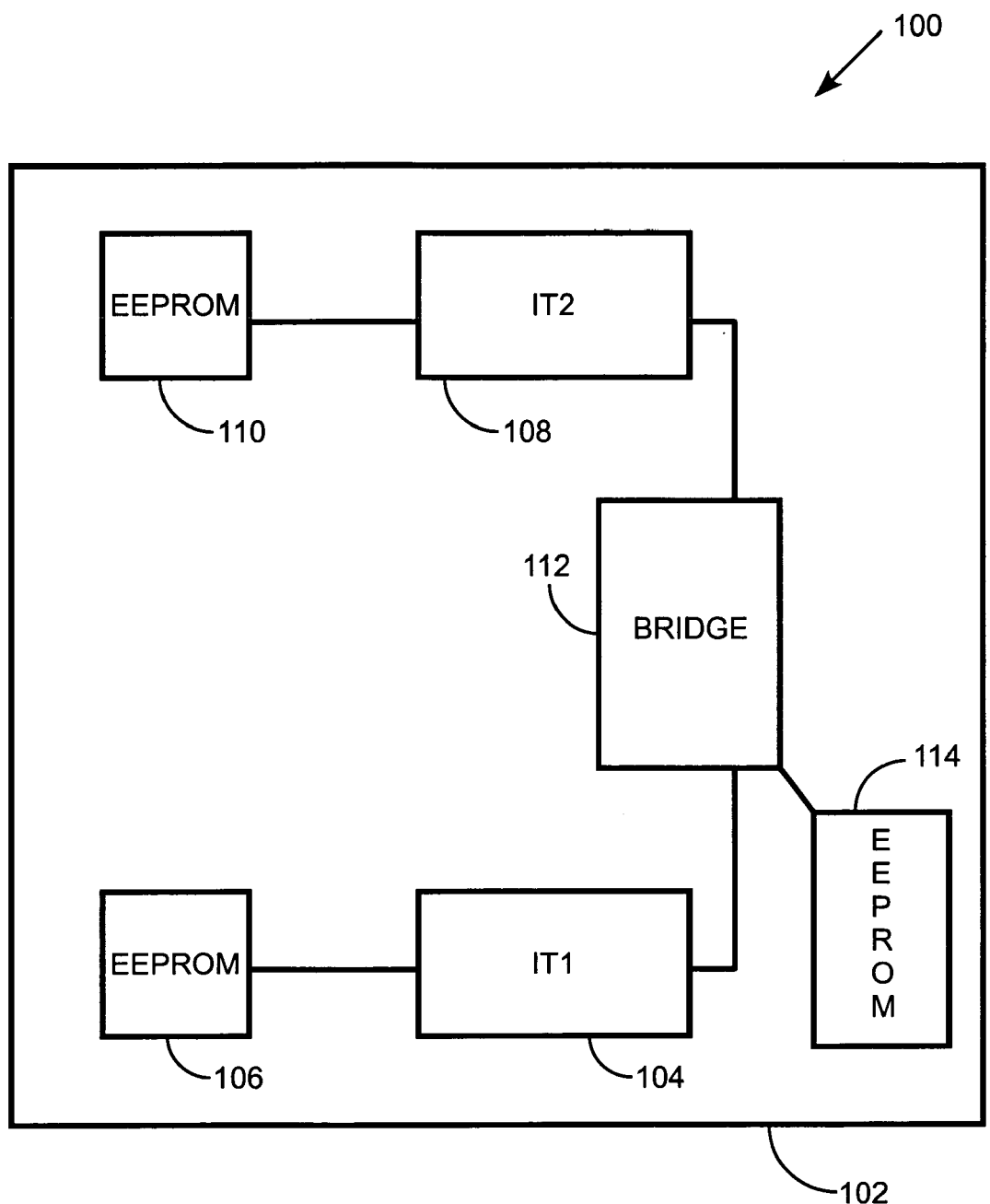
FIG. 1 is a schematic diagram depicting the arrangement of interface technologies connected by a bridge on a host adapter card in accordance with one embodiment of the invention.

An invention is described for an apparatus and method for combining different interface technologies on a host bus adapter (HBA) in a manner allowing for a user to conveniently optimize the configuration of the different technologies as dictated by the user's system. It will be obvious, however, to one skilled in the art, that the present invention may be practiced without some or all of these specific details. In other instances, well known process operations have not been described in detail in order not to unnecessarily obscure the present invention.

The embodiments of the present invention provide an apparatus and method for combining different technologies on a host bus adapter (HBA) card in a manner which allows the user flexibility to configure the interface with the HBA card so that the configuration is optimal for the user's system configuration. In addition, the HBA card can be used as a mixed mode device i.e., as a low speed device and a high speed device. In one embodiment, the HBA card includes multiple interface technologies, such as a Universal Serial Bus (USB) component and a 1394 component, each in communication with a bridge chip. In this embodiment, each interface technology, along with the bridge chip, are associated with programmable memory. An example programmable memory is an electrically erasable programmable read only memory (EEPROM), which allows for the optimization of the initialization process across a broad number of systems. In another embodiment, where the interface technologies are 1394 and USB controllers, the controllers are hard addressed to the lowest PCI address lines, such as address lines a19 and a22. These address lines are supported by all current basic input output systems (BIOS), which in turn, allows the BIOS to see the card in the boot-up process.

In another embodiment, a utility for the associated EEPROM's of the technologies i.e., USB and 1394 controllers and the bridge chip, enables the reading and modification of the contents of the EEPROM. By associating each of the interface technologies and the bridge chip with an EEPROM, modification of the configuration of the controllers in communication with the EEPROM is thereby enabled while each of the controllers is mounted on the card in a system. That is, the EEPROMs can be modified in-circuit to better balance system performance and functionality. In yet another embodiment, the contents of the EEPROM can be modified by accessing a vendor's web site to download an update through a distributed network such as the Internet. As will be explained in more detail below, the different hardware components of the BA card are synchronized to reply to active requests by the operating system in order to provide a flawless interface. It should be appreciated that while the embodiments described below may provide exemplary illustrations of USB and 1394 interface technologies being combined on the host bus adapter card, these illustration are not meant to be limiting.

FIG. 1 is a schematic diagram depicting the arrangement of interface technologies connected by a bridge on a host adapter card in accordance with one embodiment of the invention. Bridge 112 is in communication with interface technology controller 1 (IT1) 104 and interface technology controller 2 (IT2) 108. In one embodiment, IT1 104 is a USB chip and IT2 108 is an Institute of Electrical and Electronics Engineers (IEEE) 1394 chip while bridge 112 is a PCI—PCI bridge such as those available from HINT CORPORATION from Fremont Calif. The bridge chip 112 is in communication with a PCI slot on a user's computer. In one embodiment of the invention, the bridge 112 takes transaction requests from the host computer and arbitrates for the interface technology controller (IT1 or IT2) target. Once the arbitration is granted then everything is sent directly to the controller of the interface technology target. Thus, in this embodiment there is zero latency, no clocking and no buffering issues. In another embodiment, the bridge is configured to handle any type of error condition occurring on a PCI bus to ensure reliable operation so that the controllers behind the bridge and the motherboard of the host computer are not upset by an error condition.

Associated with IT1 104 is a user modifiable read only memory such as an electrically erasable programmable read only memory (EEPROM) 106. The EEPROM 106 allows for access to modify the programming of the controller associated with EEPROM 106. For example, where IT1 104 is a USB controller, a utility may allow for accessing the EEPROM 106 in order to optimize the configuration of the USB controller. As used herein, a utility is any code, program or application for accessing the EEPROMs associated with interface technologies (IT1 104 and IT2 108) and the bridge chip 112. The initialization function for each of the various platforms utilized by personal computers can be accommodated by programming the EEPROM 106 so that the associated interface technology i.e., USB or IEEE 1394, is recognized by a broad range of platforms.

Similar to IT1 104, IT2 108 is in communication with a user modifiable read only memory such as EEPROM 110. In one embodiment, IT2 108 is a different technology interface than IT1 104, such as an IEEE 1394 interface, the EEPROM 110 allows for access to modify the programming of the controller associated with EEPROM 110 as discussed above with respect to EEPROM 106. Additionally, bridge 112 is in communication with a user modifiable read only memory such as an electrically erasable programmable read only memory (EEPROM) 114. In another embodiment, EEPROM 114 allows for reprogramming the bridge chip 112 so that different power management levels are recognized by the components of the HBA card 102, as will be explained in more detail below. In addition, the programming of the hardware components, IT1 104, IT2 108 and bridge 112, can be updated by downloading the utility from the vendor's web site via a distributed network, such as the Internet in another embodiment. For example, where the configuration of the programming of the controllers must be modified to support a newer version of some other system architecture, the utility can be provided to the user through the HBA card 102 vendor's web site.

Figure 2:
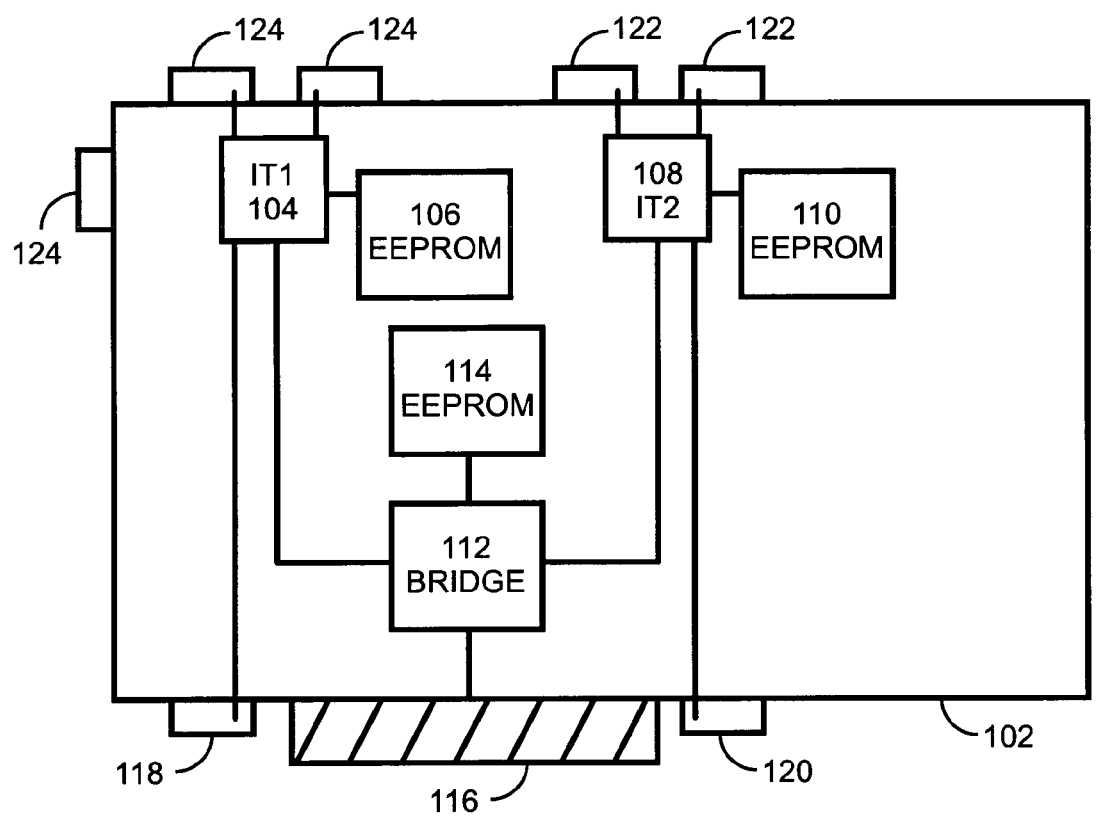
FIG. 2 is a schematic diagram illustrating a combination host adapter card with multiple internal and external ports in accordance with one embodiment of the invention.

FIG. 2 is a schematic diagram illustrating a combination host adapter card with multiple internal and external ports in accordance with one embodiment of the invention. Host adapter card 102 includes PCI slot interface 116 in communication with bridge 112. Interface technology controller 1 104 is a USB controller in this embodiment. Three external USB ports 124 are in communication with the controller 104. Thus, a user can connect to the external ports 124 with a peripheral device configured to communicate through the USB interface. Also shown is an internal USB port 118 in communication with the USB controller 104. Interface technology controller 2 108 is an IEEE 1394 controller in this embodiment. As illustrated in FIG. 2, IEEE 1394 controller 108 is in communication with 2 external IEEE 1394 ports 122 and 1 internal IEEE 1394 port 120. Of course, host adapter card 102 can include more or less external and internal ports associated with the controller interfaces as FIG. 2 is for illustrative purposes only and not meant to be limiting.

Figure 3:
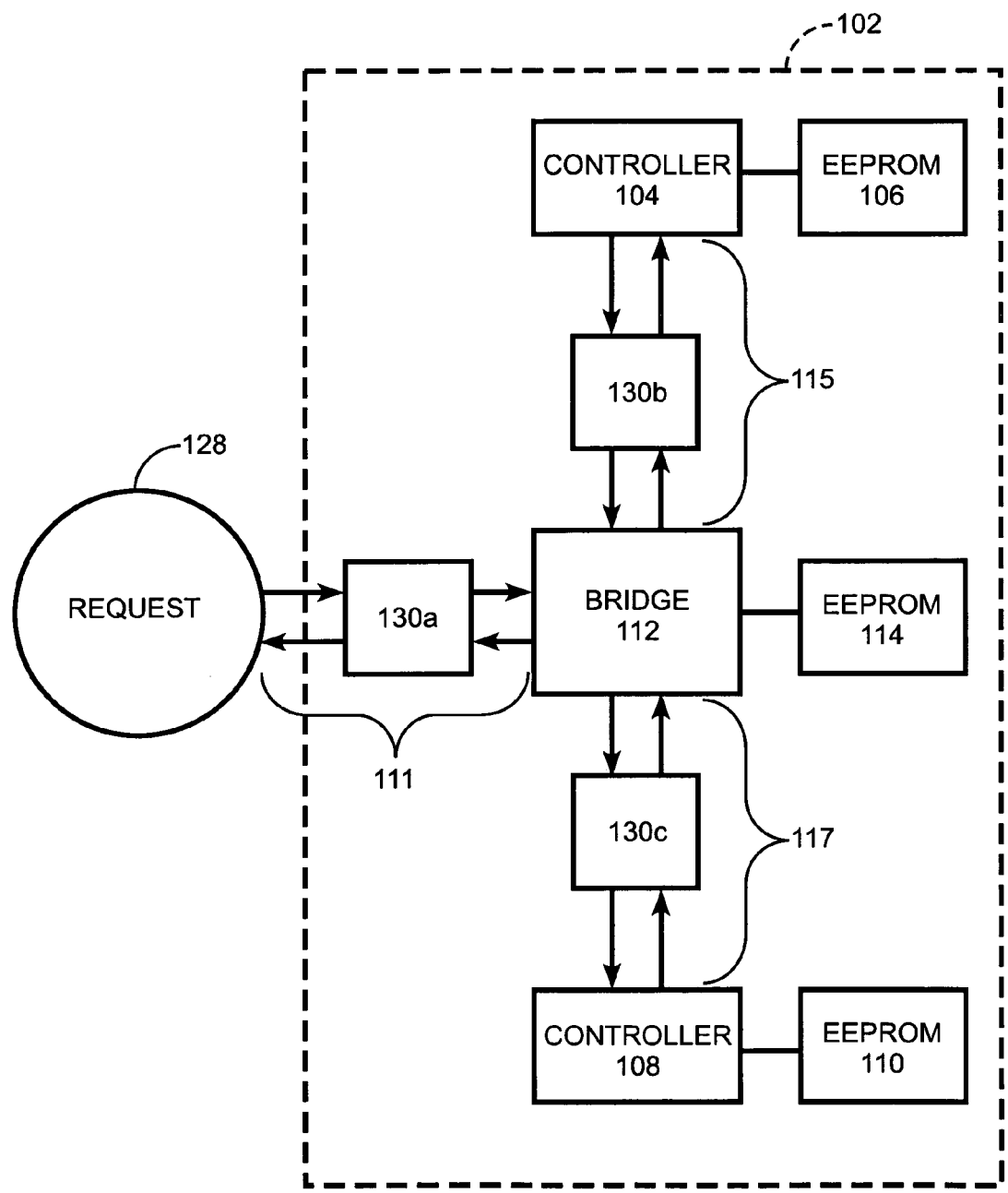
FIG. 3 is a schematic diagram depicting the handling of requests by the components of the HBA card in accordance with one embodiment of the invention.

FIG. 3 is a schematic diagram depicting the handling of requests by the components of the HBA card in accordance with one embodiment of the invention. The operating system of a general purpose computer issues active requests 128 to the HBA card 102. Each of the hardware components of the HBA card 102 e.g., the USB controller 104, IEEE 1394 controller 108 and bridge controller 112, have to process and respond to the active requests 128. In one embodiment, translation layer 130*a*, which is coupled to bridge 112 and EEPROM 114, acts as a complete translator for request 128 to controller 104 and controller 108. It will be apparent to one skilled in the art that translation layer 130*a* can be uniquely configured based on EEPROM 114 content. It should be appreciated that translation layer 130*a* is a conceptual result of bridge 112. Accordingly, hardware and software content (bridge 112 and EEPROM 114) combine to create translation layer 130*a*. Translation layers 130*a*, 130*b*, and 130*c* provide the programming for the hardware components of the HBA card 102 so that the hardware components respond to the request in a manner that is acceptable to the operating system. It should be appreciated that translation layers 130*a*, 130*b*, and 130*c* do not represent physical components of HBA board 102. Translation layers 130*a*, 130*b*, and 130*c* represent the ability to use the associated EEPROMS and the built in features of the physical hardware of HBA board 102 to change how the physical hardware interacts on primary bus 111 or secondary buses 115 and 117. For example, where the request 128 corresponds to the power management of the system, it is critical that there is no confusion upon the powering-down and the subsequent powering-up of the HBA card 102. Therefore, through the EEPROMs, the hardware components of the HBA card 102 are configured so that power management requests and responses are understood by each of the hardware components and the operating system.

Still referring to FIG. 3, request 128 originates from a host controller. Data path 111 between the host controller and bridge 112 represents a primary bus. Controllers 104 and 108 need to communicate through primary bus 111. Therefore, controllers 104 and 108 are in communication with bridge 112 through data paths 115 and 117, respectively. Data paths 115 and 117 represent secondary buses behind bridge 112. Due to the physical separation between primary bus 111 and secondary buses 115 and 117, to enable communication between the host controller and controllers 104 and 108, bridge 112 needs to synchronize with the host controller through primary bus 111. That is, bridge 112 is synchronized to primary bus 111 by configuring bridge 112 interface. One skilled in the art will appreciate that bridge 112 interface can be configured through EEPROM 114. Once the primary data path configuration is completed, controllers 104 and 108 must be synchronized to primary bus 111. That is, controllers 104 and 108 are configured to adhere to any primary bus 111 restrictions, such as power management, speed, etc. Here, EEPROMS 106 and 110 allow for the modification of the configuration characteristics of controllers 104 and 108, respectively, so that the optimal synchronization can occur. It should be appreciated that the configuration of controllers 104 and 108 match in order for HBA card 102 to communicate with a host controller over primary bus 111. The above description for FIG. 3 can be thought of as a master-slave relationship. For example, bridge 112 is a master that is configured through EEPROM 114. Then, slave controllers 104 and 108 are configured to adhere to any primary bus restrictions through EEPROMS 106 and 110, respectively. The primary bus restrictions include power, speed, etc.

Within each PCI bridge there is a power manager which allows for placing the adapter card 102 in either a stand-by or sleep mode. Additionally, there can be several degrees of sleep mode. Once the card 102 is in either a stand-by or sleep mode, the card 102 must be powered back-up to an active mode. A complicating factor in achieving this outcome is that the hardware components, PCI bridge controllers and interface technology controllers define the power management states according to a hardware convention, while the operating systems and associated software define power management states according to a software convention. Even within hardware and software conventions the power management states are defined differently. More specifically, in PCI architecture (which uses the hardware convention) the sleep states are typically referred to as D0–D5, where the states move gradually from D0 toward an off state (D5). On the other hand, operating system implementers define their power management modes in a different way. For example, operating systems typically refer to states S0–S5 for the various power down states. However, state S0 does not correlate to state D0 in the conventions adopted for the respective hardware and software components.

Therefore, the EEPROMs of FIGS. 1 and 2 act as translators where the EEPROMs 106, 110 and 114 for each associated hardware component is configured to ensure that each hardware controller receives a power management request that it understands and issues a response to the power management request that the operating system understands. Accordingly, upon power-down and subsequent power-up cycles the components of the HBA card 102 respond in a manner understood by the operating system. In addition, the active requests 128 from the operating system are understood by the hardware components of the HBA card 102. Thus, the bridge controller 112 is capable of functioning on the HBA card 102 and through the association with EEPROM 114, controller 112 is enabled to be accessed through the utility in order to modify the programming of the bridge controller 112.

In one exemplary embodiment of the invention, the hardware components include the NEC μPD720100 USB host controller, the TEXAS INSTRUMENTS TI TSB12LV26 IEEE 1394 host controller and the HiNT HB1-SE PCI—PCI bridge. It should be appreciated that the invention is not limited to these hardware components as any USB controller, any 1394 controller and any PCI—PCI bridge may be used as hardware components. In another embodiment, the hardware components can include any interface technologies for communicating with peripheral devices. Tables 1, 2 and 3 below illustrate the power management control settings for exemplary hardware components of the Host Bus Adapter card 102 in one embodiment. As illustrated in each table below, the hardware components refer to the hardware convention in reference to the various power states using D0–D3. There are even subtle differences between the various components using the hardware convention as illustrated by Tables 1, 2 and 3.

TABLE 1

Power Management Control and Status Register Description for a 1394 host controller

| BIT | FIELD NAME | TYPE | DESCRIPTION |
| --- | --- | --- | --- |
| 15 | PME_STS | RC | Bit 15 is set to 1 when the TSB12LV26 device normally asserts the PCI_PME signal, independent of the state of bit 8 (PME_ENB). This bit is cleared by a writeback of 1, which also clears the PCI_PME signal driven by the TSB12LV26 device. Writing a 0 to this bit has no effect. |
| 14-9 | DYN_CTRL | R | Dynamic data control. This field returns 0s when read since the TSB12LV26 device does not report dynamic data. |
| 8 | PME_ENB | R/W | When bit 8 is set to 1, PCI_PME assertion is enabled. When bit 8 is cleared, PCI_PME assertion is disabled. This bit defaults to 0 if the function does not support PCI_PME generation from $D3_{cold}$. If the function supports PCI_PME from $D3_{cole}$, this bit is sticky and must be explicitly cleared by the operating system each time it is initially loaded. Functions that do not support PCI_PME generation from any D-state (that is, bits 15-11 in the power management capabilities register at offset 46h in PCI configuration space (see Section 3.17, Power Management Capabilities Register) equal 00000b), may hardwire this bit to be read-only, always returning a 0 when read by system software. |
| 7-5 | RSVD | R | Reserved. Bits 7-5 return 0s when read. |
| 4 | DYN_DATA | R | Dynamic data. Bit 4 returns 0 when read since the TSB12LV26 device does not report dynamic data. |
| 3-2 | RSVD | R | Reserved. Bits 3 and 2 return 0s when read. |
| 1-0 | PWR_STATE | R/W | Power state. This 2-bit field sets the TSB12LV26 device power state and is encoded as follows: 00 = Current power state is D0. |

TABLE 1-continued

Power Management Control and Status Register Description
for a 1394 host controller

| BIT | FIELD NAME | TYPE | DESCRIPTION |
|---|---|---|---|
| | | | 01 = Current power state is D1 (not supported by this device).<br>10 = Current power state is D2.<br>11 = Current power state is $D3_{hot}$. |

TABLE 2

Power Consumption for a USB host controller

| Parameter | Symbol | Condition | TYP. | Unit |
|---|---|---|---|---|
| Power Consumption | $P_{WD0-0}$ | The power consumption under the state without suspend. Device state = D0, All the ports does not connect to any function. Note 1 | 284.1 | mA |
| | $P_{WD0-2}$ | The power consumption under the state without suspend. Device state = D0, The number of active ports is 2. Note 2 | | |
| | | EHCI host controller is inactive. | 302.3 | mA |
| | | EHCI host controller is active. | 409.1 | mA |
| | $P_{WD0-3}$ | The power consumption under the state without suspend. Device state = D0, The number of active ports is 3. Note 2 | | |
| | | EHCI host controller is inactive. | 311.4 | mA |
| | | EHCI host controller is active. | 471.6 | mA |
| | $P_{WD0-4}$ | The power consumption under the state without suspend. Device state = D0, The number of active ports is 4. Note 2 | | |
| | | EHCI host controller is inactive. | 320.5 | mA |
| | | EHCI host controller is active. | 534.1 | mA |
| | $P_{WD0-5}$ | The power consumption under the state without suspend. Device state = D0, The number of active ports is 5. Note 2 | | |
| | | EHCI host controller is inactive. | 329.6 | mA |
| | | EHCI host controller is active. | 596.6 | mA |
| | $P_{WD0-S}$ | The power consumption under suspend state. Device state = D0, The internal clock is stopped. Note 3 | 137.5 | mA |
| | $P_{WD0-C}$ | The power consumption under suspend state during PCI clock is stopped by CRUN0. Device state = D0, The internal clock is stopped. Note 3 | 73.8 | mA |
| | $P_{WD1}$ | Device state = D1, Analog PLL output is stopped. Note 3,4 | 74.6 | mA |
| | $P_{WD2}$ | Device state = D2, Analog PLL output is stopped. Note 3,4 | 10.9 | mA |
| | $P_{WD3H}$ | Device state = $D3_{hot}$, PIN_EN = High Analog PLL output is stopped. Note 3,4 | 10.9 | mA |
| | $P_{WD3C}$ | Device state = $D3_{cold}$, PIN_EN = Low Oscillator output is stopped. Note 3,4 | 5 | mA |

TABLE 3

Power Management Control/Status(R/W)—Offset 84 h for a PCI-PCI bridge

| Bit | Function | Type | Description |
|---|---|---|---|
| 0–1 | Power State | R/W | This 2-bit field is used both to determine the current power state of a function and to set the function into a new power state. The definition of the field values is given below.<br>00b-D0<br>01b-D1: valid only if D1 capable bits is 1<br>10b-D2: valid only if D2 capable bits is 1<br>11b-D3hot: if BCPPE is 1, SCLK output will be stopped |
| 2–7 | Reserved | R/O | Reserved |
| 8 | PME Enable | R/O | The bit set to '0' since HB1-SE does not support PME# signaling |
| 9–12 | Data Select | R/W | This 4-bit field is used to select which data is to be reported through the Data registers and Data Scale field |

TABLE 3-continued

Power Management Control/Status(R/W)—Offset 84 h for a PCI-PCI bridge

| Bit | Function | Type | Description |
|---|---|---|---|
| 13–14 | Data Scale | R/O | This 2-bit field indicates the scaling factor to be used when interpreting the value of the Data register. The value and meaning of this field will vary depending on which data value has been selected by the Data Select field |
| 15 | PME Status | R/O | This bit is set to '0' since HB1-SE does not support PME# signaling |

Figure 4A:
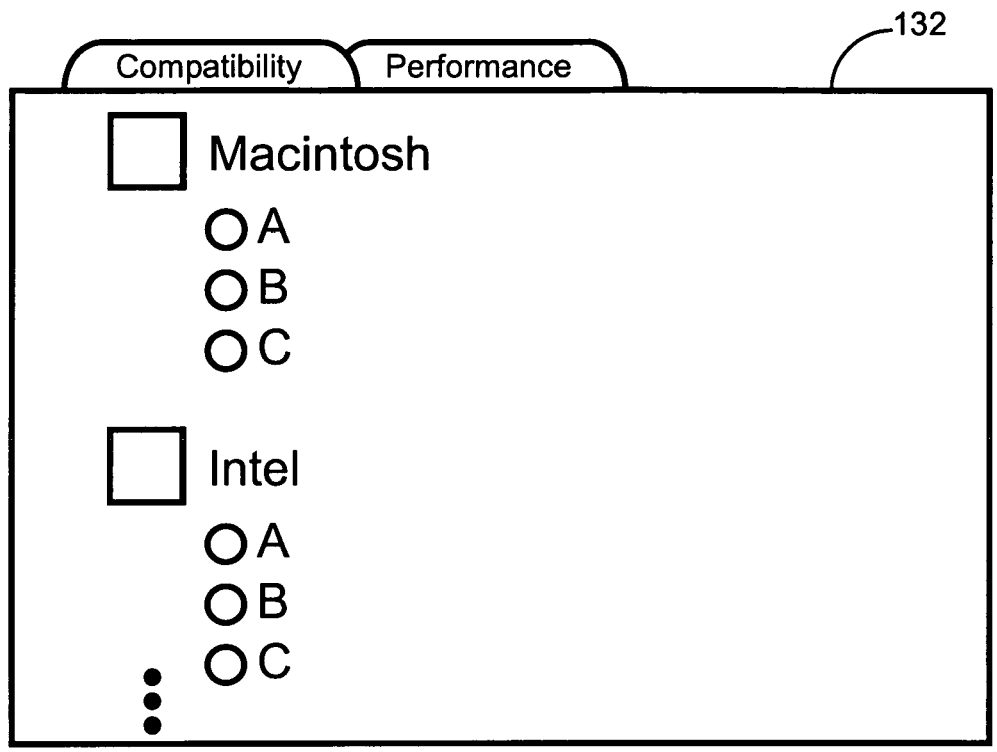
FIG. 4A is a schematic diagram of a graphical user interface (GUI) presented to the user allowing the user to configure the components of the HBA card for optimal compatibility in accordance with one embodiment of the invention.

FIG. 4A is a schematic diagram of a graphical user interface (GUI) presented to the user allowing the user to configure the components of the HBA card for optimal compatibility in accordance with one embodiment of the invention. GUI 132 depicts an interface allowing a user to optimize the configuration of the card where multiple peripheral devices are connected to the card. In one embodiment, the user can specify the system architecture i.e., Macintosh, Intel, etc. Additionally, the types of peripheral devices connected to the HBA card 102 can be specified under the system architecture. For example, where a printer, scanner and storage device are all connected to the HBA card 102, fairness of arbitration control is a significant factor to consider in reference to delivering improved performance. In this embodiment, the utility is used to configure the EEPROMs (106, 110 and 114) which in turn are configured to optimize the programming of the respective controllers on the HBA card 102 for providing a balanced impact so that the devices do not conflict.

Figure 4B:
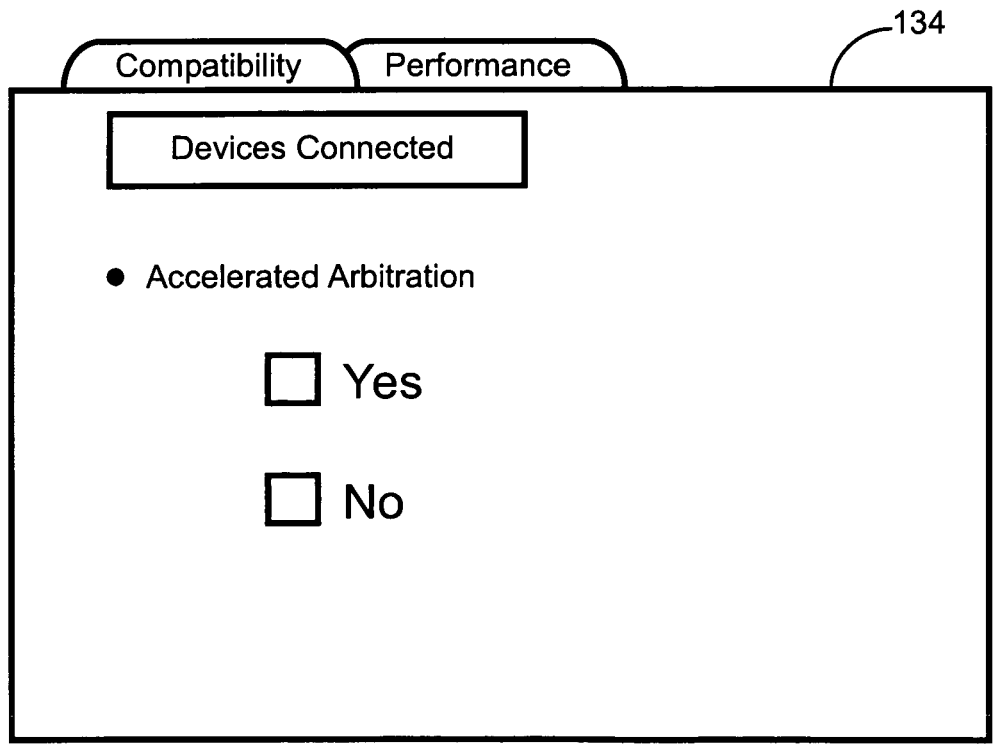
FIG. 4B is a schematic diagram of a GUI presented to the user allowing the user to configure the components of the HBA card for optimal performance in accordance with one embodiment of the invention.

FIG. 4B is a schematic diagram of a GUI presented to the user allowing the user to configure the components of the HBA card for optimal performance in accordance with one embodiment of the invention. For example, where a user has a single storage device connected to one of the external ports of the HBA card 102, the user is not concerned with fairness of arbitration where multiple devices are competing for bandwidth on the same connection. Therefore, the user can specify accelerated arbitration in addition to inputting the devices connected to the HBA card 102. In this embodiment, the EEPROMs (106, 110 and 114) are configured by the utility to modify the programming of the respective controllers of the HBA card 102 for providing improved performance through accelerated arbitration. FIGS. 4A and 4B are exemplary illustrations of GUIs and are not meant to be limiting as the GUIs can include other formats in order to allow a user to optimize the configuration of the controllers of the HBA card 102 in a transparent manner to the user.

Attached below is the specification for the EEPROMs (106, 110 and 114) for the interface technology controllers and the bridge controller in accordance with one embodiment of the invention. In this embodiment, the specifications correspond to the EEPROMs associated with the PCI—PCI Bridge, the Firewire controller and the USB 2.0 controller. The specification below includes the settings communicated through the EEPROMS 106, 110 and 114 to the respective controllers for the power management of the HBA card 102 and its hardware components.

EEPROM SPECIFICATIONS
Copyright © 2001 Adaptec Inc. All rights reserved.
INTRODUCTION EEPROM default image includes:

USB 2.0 HARDWARE DATA:

Includes the Subsystem Vender ID for OHCI#1, OHCI#2, EHCI
Includes the Subsystem ID for OHCI#1, OHCI#2, EHCI
Includes the Min_Gnt for OHCI#1, OHCI#2, EHCI
Includes the Max_Lat for OHCI#1, OHCI#2, EHCI
Includes the commands Firewire HARDWARE DATA:

Includes the Subsystem Vender ID
Includes the Subsystem ID
Includes the Mm _Gnt and Max_Lat
Includes the 1394 GUID

BRIDGE HARDWARE DATA:

Includes the EEPROM signature
Includes the Region Enable
Includes the Secondary Clock Enable
Includes the Vender ID
Includes the Product ID
Includes the Subsystem Vender ID
Includes the Subsystem ID
Includes the Miscellaneous
Includes the PMC Register
Includes the Test Register

USB SERIAL EEPROM DATA

| Field # | Field Name | Byte Address | # bytes (in Decimal) | Default Value (in Hex) |
|---|---|---|---|---|
| 1 | Subsystem Vender ID for OHCI#1 | 00h-01h | 2 | 9004 |
| 2 | Subsystem Vender ID for OHCI#2 | 02h-03h | 2 | 9004 |
| 3 | Subsystem Vender ID for EHCI | 04h-05h | 2 | 9004 |
| 4 | Subsystem ID for OHCI#1 | 06h-07h | 2 | 0235 |
| 5 | Subsystem ID for OHCI#2 | 08h-09h | 2 | 0235 |
| 6 | Subsystem ID for EHCI | 0ah-0bh | 2 | 02E0 |
| 7 | Min_Gnt for OHCI#1 & 2 | 0ch-0dh | 2 | 0101 |
| 8 | Min_Gnt for EHCI, Max Lat for OHCI#1 | 0eh-0fh | 2 | 2A10 |
| 9 | Max_Lat for OHCI#2 & EHCI | 10h-11h | 2 | 222A |
| 10 | Command | 12h-13h | 2 | 0000 |
| 11 | Command | 14h-15h | 2 | 33A2 |
| 12 | Command | 16h-17h | 2 | C410 |

Subsystem ID for OHCI #1 & #2

| Byte 1 | | | | | | | | Byte 0 | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 0 | 000b | | | 2h | | | | 3h | | | | 5h | | | |
| Power Management | (Board Revision) | | | (Board identification, 2=AUA-3121) | | | | | | | | | | | |

Subsystem Vender ID for EHCI

| Byte 1 | | | | | | | | Byte 0 | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| 0 | 000b | | | 2h | | | | Eh | | | | 0h | | | |
| Power Management | (Board Revision) | | | (Board identification, 2=AUA-3121) | | | | | | | | | | | |

| byte 3 or 7 | byte 2 or 6 | byte 1 or 5 | byte 0 or 4 | Defalt value |
|---|---|---|---|---|
| 31 30 29 28 27 26 25 | 24 23 22 21 20 19 18 17 16 | 15 14 13 12 11 10 9 8 | 7 6 5 4 3 2 1 0 | |
| Subsystem Vender ID for OHCI #2 | | Subsystem Vender ID for OHCI #1 | | 9004 9004 h |
| Subsystem Vender ID for OHCI #1 | | Subsystem Vender ID for EHCI | | 0035 9004 h |
| Subsystem Vender ID for EHCI | | Subsystem Vender ID for OHCI #2 | | 00E0 0035 h |
| Max_Lat for OHCI #1 | Min_Gnt for EHCI | Min_Gnt for OHCI #2 | Min_Gnt for OHCI #1 | 2A10 0101 h |
| 0000 | PME_support for EHCI / Aux_Current for EHCI / PME_support for OHCI #1 / Aux_Current for OHCI #1 / PME_support for OHCI #2 / Aux_Current for OHCI #2 | Max_Lat for EHCI | Max_Lat for OHCI #2 | 0000 222A h |
| C4_HEX | EHCI MASK register / Ehci_mask in register / Legc mode in EXT register 0b / 10_HEX | 33_HEX | Port number in EXT register / 000 / PPP_setting in EXT register / 0 | C410 33A2 h |

1394 SERIAL EEPROM DATA

| Field # | Field Name | Byte Address | # bytes (in Decimal) | Default Value (in Hex) |
|---|---|---|---|---|
| 1 | PCI max_lat (4 bits)/PCI min gnt (4 bit) | 00h | 1 | 43 |
| 2 | Subsystem Vender ID | 01h-02h | 2 | 104C |
| 3 | Subsystem ID | 03h-04h | 2 | 8010 |
| 4 | Link Enhancement Register Byte 0 | 05h | 1 | 42 |
| 5 | Reserved | 06h | 1 | 00 |
| 6 | 1394 GUID Hi 0 (8-bit chip id) | 07h | 1 | B5 |

-continued

1394 SERIAL EEPROM DATA

| Field # | Field Name | Byte Address | # bytes (in Decimal) | Default Value (in Hex) |
|---|---|---|---|---|
| 7 | 1394 GUID Hi 1-3 (24-bit node vendor id) | 08h-0ah | 3 | 005042 |
| 8 | 1394 GUID Lo (32-bit chip id from serial.dat) | 0bh-0eh | 4 | ######## |
| 9 | ROM CRC (Calculated) | 0fh | 1 | XX |
| 10 | Link Enhancement Register Byte 1 | 10h | 1 | 10 |
| 11 | PCI Miscellaneous Control Register Byte 0 | 11h | 1 | 10 |
| 12 | PCI Miscellaneous Control Register Byte 1 | 12h | 1 | 00 |
| 13 | PCI OHCI Control Register Byte 0 | 13h | 1 | 00 |
| 14 | CIS offset | 14h | 1 | 00 |

| byte 3 or 7 | byte 2 or 6 | byte 1 or 5 | byte 0 or 4 | Defalt Data |
|---|---|---|---|---|
| 3 3 2 2 2 2 2 2<br>1 0 9 8 7 6 5 4 | 2 2 2 2 1 1 1 1<br>3 2 1 0 9 8 7 6 | 1 1 1 1 1 1 0 0<br>5 4 3 2 1 0 9 8 | 0 0 0 0 0 0 0 0<br>7 6 5 4 3 2 1 0 | |
| Subsystem ID (lsb) | Subsystem Vendor ID | Min_gnt | Max_lat | 10104C43 |
| 1394 GUID Hi (0)<br>8-bit chip id | Reserved | Link En Reg. Byte 1 | Subsystem ID (msb) | B5004280 |
| 1394 GUID Lo (0)<br>8-bit chip id * | 1394 GUID Hi (1-3)<br>24-bit mode vendor id | | | ##005042 |
| ROM CRC<br>(Calculated by EELynx) | 1394 GUID Lo (1-3)<br>32-bit chip id (* These values are incremented from serial.dat) | | | XX###### |
| OHCI Ctrl Reg.<br>Byte 0 | Misc. Ctrl Reg. Byte 1 | Misc. Ctrl Reg. Byte 0 | Link En Reg. Byte 1 | 00001010 |
| Reserved | | | CIS offset | FFFFFF00 |

PCI BRIDGE SERIAL EEPROM DATA

| Field # | Field Name | Byte Address | # bytes (in Decimal) | Default Value (in Hex) |
|---|---|---|---|---|
| 1 | EEPROM signature | 01h-00h | 2 | 1516 |
| 2 | Region Enable | 02h | 1 | 1E |
| 3 | Secondary Clock Enable | 03h | 1 | 00 |
| 4 | Subsystem Vender ID | 05h-04h | 2 | 9004 |
| 5 | Subsystem ID | 07h-06h | 2 | 3121 |
| 6 | Miscellaneous | 09h-08h | 2 | 0200 |

-continued

PCI BRIDGE SERIAL EEPROM DATA

| Field # | Field Name | Byte Address | # bytes (in Decimal) | Default Value (in Hex) |
|---|---|---|---|---|
| 7 | Vendor ID | 0Bh-0Ah | 2 | 3388 |
| 8 | Device ID | 0Dh-0Ch | 2 | 0021 |
| 9 | Miscellaneous | 0Fh-0Eh | 2 | 0000 |
| 10 | PMC register | 13h-10h | 4 | 00007E02 |
| 11 | Test Register | 17h-14h | 4 | 00000000 |

| byte 3 or 7 | byte 2 or 6 | byte 1 or 5 | byte 0 or 4 | Defalt Data |
|---|---|---|---|---|
| 3 3 2 2 2 2 2 2<br>1 0 9 8 7 6 5 4 | 2 2 2 2 1 1 1 1<br>3 2 1 0 9 8 7 6 | 1 1 1 1 1 1 0 0<br>5 4 3 2 1 0 9 8 | 0 0 0 0 0 0 0 0<br>7 6 5 4 3 2 1 0 | |
| Secondary Clock Enable | Region Enable | EEPROM signature | | 001E1516 |
| Subsystem Vender ID | | Subsystem Vender ID | | 31219004 |
| Vendor ID | | Miscellaneous | | 33880200 |
| Miscellaneous | | Device ID | | 00000021 |
| PMC register | | | | 00007E02 |
| Test Register | | | | 00000000 |

| FIELD DEFINITIONS | |
|---|---|
| EEPROM signature: | Autoload will only proceed if it reads a value of 1516h on the first word loaded.<br>0x1516 = valid signature, otherwise disable autoloading |
| Region Enable: | Enables or disables certain regions of the PCI configuration space from being loaded from the EEPROM. Valid combinations are: |
| Bit 0: | Reserved |
| Bits 4-1: | 0000 = stop autoload at offset 02h<br>0001 = stop autoload at offset 04h<br>0011 = stop autoload at offset 07h<br>0111 = stop autoload at offset 11h<br>1111 = autoload all EEPROM loadable registers.<br>Other combinations are undefined. |
| Bits 7-5: | Reserved |
| Secondary Clock Enable: | |
| Bit0: | 1 = disable SCLKO[0] output |
| Bit1: | 1 = disable SCLKO[1] output |
| Bit2: | 1 = disable SCLKO[2] output |
| Bit3: | 1 = disable SCLKO[3] output |
| Bit4: | 1 = disable SCLKO[4] output |
| Bit7-5: | Reserved |
| Subsystem Vendor ID: | 9004 |
| Subsystem ID: | 3121 |
| Miscellaneous | |
| Bit0: | register C0h, bit 0 |
| Bits7-1: | register C4h, bits 7:1 |
| Bits15-8: | register C1h |
| Vendor ID | 3388 |
| Device ID | 0021 |
| Miscellaneous | |
| Bits7-0: | register 42h |
| Bits15-8: | register C3h |
| PMC register Lo | 7E02 |
| PMC register Hi | |
| Bits7-0: | reserved |
| Bits15-8: | register 87h |
| Test Register CDh | |
| Bits7-0: | reserved |
| Bits15-8: | register CDh |

-continued

| FIELD DEFINITIONS | |
|---|---|
| Test Register CE/CFh | |
| Bits7-0: | register CEh |
| Bits11-8: | reserved |
| Bits15-8: | register CFh, bits 7-4 |

| IPL FILE FORMAT |
|---|

The LPL file should be generated with the following information:
/* This is a comment */
%product%: product_model;
%revision%: NVRAM_revision;
%default%:
DCD_Loc,DCD_starting_addr,CD_length,CCD_starting_addr,
CD_Checksum;
%nvram_size%: NVRAM_Size;
%nvram_checksum%: NVRAM_Checksum;
%begin%
NVRAM_Bytesxx
NVRAM_Bytesxx
. . .
%end%
where,

| Label | Description | Example |
|---|---|---|
| %product% | = keyword for "product" | |
| product_model | = name of the product model | AUA-3121 |
| %revision% | = keyword for "revision" | |
| NVRAM_revision | = revision number according to NVRAM Specification's revision | 1.0 |
| %default% | = keyword for "default" | |
| DCD_Loc | = "B" if DCD is in BIOS<br>= "N" if DCD is in NVRAM<br>"0" (zero) if DCD is not specified either in BIOS nor NVRAM | 0 |
| DCD_starting_addr | = a HEX number to specify the starting address of DCD<br>if DCD_Loc = "N", it specifies the address in NVRAM<br>if DCD_Loc = "B", it specifies | |

IPL FILE FORMAT (continued)

| | | |
|---|---|---|
| | the address in BIOS if DCD_Loc = "B", and it is in the form of @xxxx, it specifies the address that points to DCD address in BIOS if DCD_Loc = "0", not used | 0 |
| CD_length | = a HEX number to specify number of bytes of DCD = a HEX number to specify number of bytes of CCD if DCD_Loc = "0" | 0017h |
| CCD_starting_addr | = a HEX number to specify the starting address of CCD in NVRAM | 0000h |
| CD_Checksum | = a 16-bit HEX number to specify the checksum of DCD (or CCD). The checksum is the sum of all the bytes of DCD (or CCD) | 053Dh |
| %nvram_size% | = keyword for "nvram_size" | |
| NVRAM_Size | = a number to specify the total number, in HEX, of NVRAM bytes available, including the unused bytes | 0017h |
| %nvram_checksum% | = keyword for "nvram_checksum" | |
| NVRAM_Checksum | = a 16-bit HEX number to specify the checksum of the NVRAM. The sum should be calculated from byte 0 to the last used byte of NVRAM. In this case, it is from byte 0000 to 0017h. | 0537h |
| %begin% | = keyword for "begin" | |
| NVRAM_Bytesxx | = in "ADDR:DATA DATA ... " format to specify the starting address (offset) and the associated data bytes | |
| %end% | = keyword for "end" | |

Notes:
If the "default" line is missing from the IPL file, the Functional Test program will not be able to check for any DCD checksum or DCD vs. CCD. If there are several DCD areas (with the corresponding CCD areas), multiple "default" lines can be used to define these multiple DCD areas.
A comment can be specified by surrounding the comment with /* and */ (aC language style comment).
A keyword text line has to end with a ; (semi-colon).
A space must be inserted between the : (colon) and the value (or the text string).
All numbers are specified in HEX.
The block surrounded by keywords "begin" and "end" is for specifying NVRAM content. (But no ending ; (semi-colon) for "begin" and "end" keywords.)
Multiple data bytes can be specified sequentially on one line. The starting address of those data bytes is specified in the ADDR field of that line.

1394 OHCI-ROM User's Guide

OHCI-ROM is a DOS application that can be used to access the configuration EEPROM for a 1394 device. OHCI-ROM can be used to view, store, or modify the contents of the EEPROM. Of course, other utilities may be employed to access the EEPROMs 106, 110 and 114. As mentioned above, other utilities are available for accessing the EEPROMs associated with the USB controller and the PCI-PCI bridge.

Command Line Syntax

The command line syntax for OHCI-ROM is found below. Items within brackets, "[ ]", are optional. Do not include the brackets when using these parameters.

ohcirom /?
   Displays information about the usage of command line parameters.

ohcirom /v [register_name_file]
   Views the current contents of the EEPROM.

ohcirom /d output_file [register_name_file]
   Dumps the current contents of the EEPROM to an output file.

ohcirom /p input_file
   Programs the EEPROM with data from the input file. Also performs a "read-back" check of the data. Returns 0 if the EEPROM was programmed correctly or 1 if there was an error.

ohcirom /p input_file /y
   Programs the EEPROM with data from the input file and forces OHCI-ROM to load the serial number from the file serial.data. OHCI-ROM will not display the "Y/N" prompt.

ohcirom /p input_file /n
   Programs from EEPROM with data from the input file and asks the user to enter the serial number. OHCI-ROM will not display the "Y/N" prompt.

ohcirom /p input_file /g:XXXXXXXXXXXXXXXX
ohcirom /p input_file /g:%ENVVAR%
   Programs the EEPROM with data from the input file and uses the 64-bit GUID that follows the "/g" option. Either the GUID can be specified as 16 hex digits or it can be defined in an environment variable that is entered on the command line.

ohcirom /u
ohcirom /u /y
ohcirom /u /n
ohcirom /u /g:XXXXXXXXXXXXXXXX
ohcirom /u /g:%ENVVAR%
   These commands work like the "/p" commands except they only update the GUID and CRC and don't require a data file.

ohcirom /L
   Reads the 64-bit GUID from the EEPROM and sends it to the standard output.

ohcirom /c
   Clears the contents of the EEPROM to all zeros.

ohcirom /s
   Sets the contents of the EEPROM to all Fs.

ohcirom /b
   Checks for a blank EEPROM. Returns 0 if the EEPROM is blank and 1 if not blank.

The designator input_file represents the name of the file that contains the data to be programmed into the EEPROM. This file must follow the format specified in Section 5.1.1. The designator register_name_file represents the name of the file that contains a set of strings to be used as register names for the various addresses in the EEPROM. This file is optional but increases the readability of the output files and screen views of the EEPROM. The register_name_file must follow the format specified in Section 5.1.2. The designator output_file represents the name of the file that will contain the current contents of the EEPROM. This file will be created by OHCI-ROM. Section 5.1.3 describes the format of the output_file.

Input File

The primary content of the input_file is the data to be programmed into the EEPROM. The input_file also contains the addresses at which each byte of data will be written and optional comment lines that can be used for documentation within the file.

The following rules apply when building the input_file.

Comments must be preceded by a semi-colon ';' and can appear at any point within the file.

Lines that contain valid data must begin with the register address in hexadecimal format.

The register address must be followed with the byte of data to be written to that address.

The data can be entered in binary, decimal, or hexadecimal format. Binary data must be preceded with a '0b'. For example, '0b01101011'. Hexadecimal data must be preceded with a '0x'. For example, '0xC4'. Decimal data can be entered directly. For example, '115'.

Only one byte of data can be defined per line.

All white space and blank linkes are ignored. Please use spaces instead of tabl characters.

Only the data at addresses specified in the file will be modified. In other words, if an address is skipped in the file, the data in the EEPROM at the skipped address will not be modified.

The following is an example of a valid input_file.

| ;TSB12LV2G default EEPROM Data File | | | |
|---|---|---|---|
| ;Register | 0xXX | Binary | Description |
| ;-------- | ----- | ------ | ----------- |
| 00 | 0x43 | ;01000010 | PCI max_lat (lower 4 bits)/ PCI min gnt (lower 4 bits) |
| 01 | 0x4C | ;00000000 | PCI Subsystem Vendor ID (lsbyte) |
| 02 | 0x10 | ;00000000 | PCI Subsystem Vendor ID (msbyte) |
| 03 | 0x10 | ;00000000 | PCI Subsystem ID (lsbyte) |
| 04 | 0x80 | ;00000000 | PCI Subsystem ID (Msbyte) |
| 05 | 0x42 | ;11000110 | Link Enhancement Register Byte 0 |
| 06 | 0x00 | ;00000000 | Reserved |
| 07 | 0xB5 | ;00000000 | 1394 GUID Hi (0) 8-bit chip id hi |
| 08 | 0x42 | ;00000000 | 1394 GUID Hi (1) LSB of 24 bit node vendor id |
| 09 | 0x50 | ;00000000 | 1394 GUID Hi (2) middle byte of 24-bit node vendor id |
| 0a | 0x00 | ;00000000 | 1394 GUID Hi (3) MSB of 24 bit node vendor id |
| 0b | #### | ;######## | * 1394 GUID Lo (0) byte 0 (LSB) of 32-bit chip id lo |
| 0c | #### | ;######## | * 1394 GUID Lo (1) byte 1 of 32-bit chip id lo |
| 0d | #### | ;######## | * 1394 GUID Lo (2) byte 2 of 32-bit chip id lo |
| 0e | #### | ;######## | * 1394 GUID Lo (3) byte 3 (MSB) of 32-bit chip id lo |
| 0f | xxxx | ;XXXXXXXX | ROM CRC (Calculated by EELynx) |
| 10 | 0x10 | ;00010000 | Link Enhancement Register Byte 1 |
| 11 | 0x10 | ;00010000 | PCI Miscellaneous Control Register Byte 0 |
| 12 | 0x24 | ;00100100 | PCI Miscellaneous Control Register Byte 1 |
| 13 | 0x00 | ;00000000 | PCI OHCI Control Register Byte 0 |
| 14 | 0x00 | ;00000000 | Reserved |
| ; | | | |
| ; * NOTE: These values are auto incremented from serial.dat | | | |

The input_file also has support for two different kinds of variable data; CRCs (cyclic redundancy checks) and serial numbers. To specify that a CRC is to be programmed at a specific location, put "XXXX" in place of the data. To specify that a serial number is to be used, put "####" in place of the data. Section 5 discusses how and when to use CRCs and serial numbers.

Register Name File

The register_name_file contains a series of text strings that can be used to describe each byte location in the EEPROM. This description is used when OHCI-ROM dumps the contents of the EEPROM either to the screen or to a file. The register_name_file must contain one register description per line. No comment lines are allowed. A blank line can be used if a description is not needed for a particular register. OHCI-ROM starts reading the register_name_file from the top and assigns the first line to register 0, the second line to register 1, and so on. Register names should never exceed 255 characters.

The following is an example of a valid AUA-3121 register-_name_file.

PCI max_lat/min_gnt
PCI Vendor ID (0)
PCI Vendor ID (1)
PCI Subsystem ID (0)
PCI Subsystem ID (1)
Link Enhancement
Reserved
GUID Hi (0) 8-bit chip id hi
GUID Hi (1) LSB of 24-bit node vendor id
GUID Hi (2) middle byte of 24-bit node vendor id
GUID Hi (3) MSB of 24-bit node vendor id
GUID Lo (0) byte 0 of 32-bit chip id lo
GUID Lo (1) byte 1 of 32-bit chip id lo
GUID Lo (2) byte 2 of 32-bit chip id lo
GUID Lo (3) byte 3 of 32-bit chip id lo
CRC ROM
Link Enhancements Byte 0
PCI Misc. Byte 0
PCI Misc. Byte 1
PCI OHCI Control Byte 0

If no register_name_file is specified, OHCI-ROM will look for one of the default register name files in the same directory as the OHCI-ROM executable.

Output File

The output_file will receive a dump of the current contents of the EEPROM. The format of the output_file is very similar to that of the input_file. In fact, an output_file can be used as an input_file.

The following is an example of an output_file from an OHCI-Lynx device.

| ;EEPROM Data Dump - example EEPROM Data File | | | |
|---|---|---|---|
| ;Register | 0xXX | Binary | Description |
| ;-------- | ----- | ------ | ----------- |
| 000 | 0x43 | ;01000011 | PCI max lat (4 bits) / PCI min gnt (4 bits) |
| 001 | 0x4c | ;01001100 | *PCI Subsystem Vendor ID (lsbyte) |
| 002 | 0x10 | ;00010000 | *PCT Subsystem Vendor ID (msbyte) |
| 003 | 0x10 | ;00010000 | *PCI Subsystem ID (lsbyte) |
| 004 | 0x80 | ;10000000 | *PCI Subsystem ID (msbyte) |
| 005 | 0x42 | ;01000010 | Link Enhancement Register Byte 0 |
| 006 | 0x00 | ;00000000 | Reserved |
| 007 | 0xb5 | ;10110101 | *1394 GUID Hi (0) |
| 008 | 0x42 | ;01000010 | *1394 GUID Hi (1) |
| 009 | 0x50 | ;01010000 | *1394 GUID Hi (2) |

-continued

| | | | |
|---|---|---|---|
| 00a | 0x00 | ;00000000 | *1394 GUID Hi (3) |
| 00b | 0xf1 | ;11110001 | *1394 GUID Lo (0) |
| 00c | 0x00 | ;00000000 | *1394 GUID Lo (1) |
| 00d | 0x30 | ;00110000 | *1394 GUID Lo (2) |
| 00e | 0x10 | ;00010000 | *1394 GUID Lo (3) |
| 00f | 0x35 | ;00110101 | ROM CRC |
| 010 | 0x10 | ;00010000 | Link Enhancement Register Byte 1 |
| 011 | 0x10 | ;00010000 | PCI Miscellaneous Control Register Byte 0 |
| 012 | 0x24 | ;00100100 | PCI Miscellaneous Control Register Byte 1 |
| 013 | 0x00 | ;00000000 | PCI OHCI Control Register Byte 0 |
| 014 | 0x00 | ;00000000 | CIS offset |

Notice that the output_file contains the data in both hexadecimal and binary format. This is done to make it easier to read and understand what data is located in each register. The binary data is commented out so that the output_file can be used as an input_file.
The text located in the Description column comes from the register_name_file that was specified in the command line. If no register_name_file is specified, OHCI-ROM will look for one of the default register name files.
The length of the output_file will vary depending on the size of the EEPROM connected to the host controller. OHCI-ROM will dump the entire contents of the EEPROM.

It should be appreciated that by including the EEPROMs (106, 110 and 114), which allow a utility access to the registers of the controllers of the interface technologies and the bridge, testing, the HBA card 102 becomes a much easier process. For example, an engineer is able to test the HBA card 102 in a multitude of operating environments and if the controllers of the hardware components, i.e., the interface technology chips and the bridge chip, of the HBA card 102 need to be modified, then the engineer can perform the modification in-circuit. Thus, it is not necessary to remove the controllers as the utility reads the contents of the EEPROMs and perform any modifications in one embodiment of the invention. Accordingly, the addition of the EEPROMs to the HBA card 102 provides for an efficient diagnostic tool.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An adapter card configured to be in communication with a general purpose computer, the general purpose computer having an operating system, the adapter card comprising:
    a first controller providing a first interface technology, the first controller in communication with a first programmable read only memory having a first program stored therein, the first program being in-circuit modifiable;
    a second controller providing a second interface technology, the second controller in communication with a second programmable read only memory having a second program stored therein, the second program being in-circuit modifiable; and
    a single bridge controller, the bridge controller being in communication with the first and second controllers over a secondary bus, the bridge controller in communication with a third programmable read only memory having a third program stored therein, the third program being in-circuit modifiable, the bridge controller in communication with the general purpose computer over a primary bus, wherein the first second and third programs are configured to interact with the operating system such that requests sent by the operating system are translated for the first, second and bridge controllers and responses from the first, second, and bridge controllers are translated for the operating system.

2. The adapter card as recited in claim 1, wherein the first controller is in communication with one of at least one internal port and at least one external port.

3. The adapter card as recited in claim 1, wherein the second controller is in communication with one of at least one internal port and at least one external port.

4. The adapter card as recited in claim 1, wherein the third programmable read only memory enables translation of power management states between the first and second controllers and an operating system of the general purpose computer.

5. The adapter card as recited in claim 1, wherein the third programmable read only memory enables the bridge controller to synchronize with a host controller of the general purpose computer.

6. A host bus adapter card configured to be placed into a peripheral component interface (PCI) slot of a general purpose computer, the adapter card comprising:
    a universal serial bus (USB) controller, the USB controller in communication with a first electrically erasable programmable read only memory (EEPROM);
    a 1394 controller, the 1394 controller in communication with a second EEPROM; and
    a PCI to PCI bridge, the bridge being in communication with the USB controller, the 1394 controller and a third EEPROM, wherein the first, second and third EEPROMs are configured to be accessed by a utility, the utility enabling in-circuit modification of the USB controller, the 1394 controller and the PCI to PCI bridge, the PCI to PCI bridge including a power manager configured to correlate a software power state from an operating system of the general purpose computer to a hardware power state associated with one of the USB controller or 1394 controller, wherein the bridge is a sole bridge for communication between a host controller over a primary bus and each controller over a secondary bus.

7. The host bus adapter as recited in claim 6, wherein the USB controller is in communication with one of at least one external port and at least one internal port.

8. The host bus adapter as recited in claim 6, wherein the 1394 controller is in communication with one of at least one external port and at least one internal port.

9. The host bus adapter as recited in claim 6, wherein the USB controller is hard addressed to a lowest PCI address line.

10. The host bus adapter as recited in claim 6, wherein the 1394 controller is hard addressed to a lowest PCI address line.

11. The host bus adapter as recited in claim 6, wherein a graphical user interface (GUI) is presented on the general purpose computer, the GUI configured to allow the user to modify a configuration of the USB controller, the 1394 controller and the bridge.

12. The host bus adapter as recited in claim 11, wherein the configuration of the USB controller, the 1394 controller and the bridge is modified to improve one of performance and compatibility.

13. A method for synchronizing multiple interface technologies on a host bus adapter, the host bus adapter configured to operate at a plurality of power states, the multiple interface technologies in communication with a bridge on the host bus adapter, the bridge on the host bus adapter in communication with a general purpose computer over a primary bus and the multiple interface technologies over a secondary bus, the method comprising:
    issuing a power management request to the host bus adapter from an operating system of the general purpose computer;
    translating the power management request for each of the multiple interface technologies and the bridge;
    executing the power management request;
    issuing a response that the power management request has been executed; and
    translating the response for the operating system.

14. The method as recited in claim 13, wherein the power management request is issued by the operating system according to a software convention and the response to the power management request is issued according to a hardware convention.

15. The method as recited in claim 13, wherein the translating is enabled by electrically erasable programmable read only memory (EEPROM) units, wherein one of the EEPROM units is associated with a hardware component of the host bus adapter.

16. The method as recited in claim 13, wherein the multiple interface technologies include a universal serial bus (USB) interface and a 1394 interface.

17. The method of claim 13, wherein the method operation of translating the power management request for each of the multiple interface technologies and the bridge includes,
    correlating a software power state from the operating system to a hardware power state associated with a respective controller of one of the multiple interface technologies.

* * * * *